United States Patent [19]

Kawamura et al.

[11] Patent Number: 4,734,025
[45] Date of Patent: Mar. 29, 1988

[54] INJECTION MOLDING MACHINE DWELL CONTROL SYSTEM

[75] Inventors: Hideaki Kawamura; Nobuyuki Kiya; Keiji Sakamoto, all of Hachioji, Japan

[73] Assignee: Fanuc Ltd., Minamitsuru, Japan

[21] Appl. No.: 863,377

[22] PCT Filed: Sep. 4, 1985

[86] PCT No.: PCT/JP85/00496

§ 371 Date: Apr. 29, 1986

§ 102(e) Date: Apr. 29, 1986

[87] PCT Pub. No.: WO86/01456

PCT Pub. Date: Mar. 13, 1986

[30] Foreign Application Priority Data

Sep. 4, 1984 [JP] Japan ................. 59-185049

[51] Int. Cl.⁴ ............................................. B29C 45/77
[52] U.S. Cl. .................................. 425/145; 264/40.3; 264/40.7; 264/328.8; 425/171
[58] Field of Search .............. 425/145, 147, 149, 171, 425/170, 169, 143; 264/40.7, 40.1, 328.8, 40.4, 40.3

[56] References Cited

U.S. PATENT DOCUMENTS

| 3,797,808 | 3/1974 | Ma et al. ........................... 425/145 |
| 3,870,445 | 3/1975 | Hold et al. ......................... 425/149 |
| 4,161,380 | 7/1979 | Bishop .............................. 425/149 |

FOREIGN PATENT DOCUMENTS

| 56-134 | 1/1981 | Japan . |
| 58-179631 | 10/1983 | Japan . |
| 59-64336 | 4/1984 | Japan . |
| 2119307 | 11/1983 | United Kingdom . |

Primary Examiner—Jay H. Woo
Assistant Examiner—Timothy W. Heitbrink
Attorney, Agent, or Firm—Staas & Halsey

[57] ABSTRACT

A dwell control system of an injection molding machine is adapted to drive an injection shaft by an electric motor (20) and to control the electric motor (20) by a numerical control unit (30). At the time of a dwell operation, the numerical control unit (30) operates the electric motor (20) under the application of a torque limit to apply a predetermined pressure to a molten material in a mold (4).

8 Claims, 3 Drawing Figures

INJECTION MOLDING MACHINE DWELL CONTROL SYSTEM

CROSS-REFERENCE TO RELATED APPLICATION

This application is related to U.S. application Ser. No. 863,890, filed Apr. 29, 1986, which is assigned to the same assignee as the subject application.

BACKGROUND OF THE INVENTION

This invention relates to a dwell control system for applying pressure for a prescribed period of time after the injection of a molten material in an injection molding machine.

In the working of plastics, particularly most thermoplastic elastomers such as vinyl chloride resin, it is strongly desired that productivity be improved by reducing the energy needed for such working and that a uniform product quality be obtained. Accordingly, in recent years such devices as injection molding machines having a control unit incorporating a computer for accurate machining control have been put into practical use. FIG. 3 is a view showing the control system arrangement of an injection molding machine employed in the prior art. This conventional injection molding machine control system will now be described with reference to FIG. 3. In FIG. 3, numeral 1 denotes a hopper for holding chips of a thermoplastic elastomer such as vinyl chloride, and numeral 2 designates a screw for feeding the chips contained in the hopper 1 in the direction of a cylinder 2'. Due to rotation of the screw 2, the chips are fed to the cylinder 2' and are melted by the application of heat. The molten material, which is supplied to and fills the cylinder 2' and a nozzle 3, is injected into a mold 4 by movement of the screw 2 in the direction of the nozzle 3. Numeral 5 denotes a hydraulic motor for rotatively driving the screw 2, 6 a flowrate control valve for regulating the amount of oil supplied to the hydraulic motor 5, 7 a hydraulic cylinder for controlling back-and-forth movement of an injection shaft 2" (a shaft for moving the screw back and forth) inside the cylinder 2', and 8 a servo valve for controlling hydraulic pressure fed to the hydraulic cylinder 7. Numeral 9 denotes a tachogenerator for sensing the rotational speed of the screw 2 and for applying a screw rotation signal to a process control unit 15, described below. Numeral 11 represents an absolute encoder for sensing the axial position of the screw 2 and for producing a screw position signal applied to the process control unit 15. Numeral 12 designates a pressure sensor for sensing hydraulic chamber pressure of the hydraulic cylinder 7 and for producing injection pressure and back pressure signals applied to the process control unit 15. Numeral 13 denotes a cavity pressure sensor for sensing the pressure in a cavity of the mold 4 and for producing a detection signal applied to the process control unit 15.

The process control unit 15 has an internal computer, executes processing on the basis of input signals from each of the above-mentioned sensors and from temperature sensors provided on the mold 4 and the heating cylinder, and outputs a servo valve control signal, a flowrate control signal and a temperature control signal.

In the conventional injection molding machine control system constructed as set forth above, the servo valve 8 is operated on the basis of the flowrate control signal and the servo valve control signal produced by the process control unit 15 after the mold 4 is clamped and set, and the screw 2 is moved in the direction of the nozzle 3 so that the molten material filling the interior of the cylinder 2' is injected into the mold 4 from the nozzle 3. When the molten material is thus injected, the process control unit 15 executes control for dwell over a predetermined period of time, subsequently executes cooling control, retracts the screw 2 by operating the hydraulic cylinder 7 and effects control for unclamping the mold 4. After the workpiece molded by the mold is extracted, the mold 4 is reclamped, the hydraulic motor 5 is driven to rotate the screw, and the chips in the hopper 1 are fed into the cylinder 2' and melted. Thereafter, the injection operation is performed as described above to mold workpieces one after another.

In the conventional injection molding machine control system, the screw 2 is operated by the hydraulic motor 5 and hydraulic cylinder 7, so that control is implemented hydraulically. However, a hydraulic control system has a slow control response and a complicated mechanism, and is troublesome in terms of maintenance.

A system has recently been proposed in which the screw of the injection molding machine screw is driven by electric motors and primary control is implemented by a computer.

However, various problems are encountered during control when the screw 2 and the injection shaft 2" of the injection molding machine are driven by electric motors.

For example, in an injection step performed by the injection molding machine, a dwell operation is required for applying pressure for a prescribed period of time after the injection of the molten material. However, difficulties are encountered in executing this through an electrical control system.

SUMMARY OF THE INVENTION

An object of the present invention is to provide an injection molding maching dwell control system which, in order to solve the aforementioned problem, uses a torque limiting technique of an NC unit to apply a torque limit to an electric motor, thereby simplifying the control system of the injection molding machine and enabling rapid and accurate dwell to be carried out.

According to the present invention, there is provided a dwell control system of an injection molding machine in which raw material chips in a hopper are fed into a cylinder by a screw rotated by an electric motor, and the raw material inside the cylinder is injected into a mold by movement of the screw. The system includes an injection shaft having a screw, injection shaft moving means for moving the injection shaft longitudinally inside the cylinder and having a torque limit function, means for setting a final target position of the injection shaft moving means, means for commanding a predetermined position beyond the target position after the injection shaft has reached the final target position, and means for limiting pressure received by the injection shaft when the command for moving the injection shaft to the predetermined position beyond the final target position is received.

The injection molding machine dwell control system according to the present invention is so adapted that a numerical control unit applies the torque limit command to an electric motor driving the injection shaft at the time of dwell. Accordingly, the control system of the injection molding machine can be simplified over the prior-art arrangement and dwell control of the injection molding machine can be performed rapidly and accurately.

DESCRIPTION OF THE PREFERRED EMBODIMENT

Figure 1:
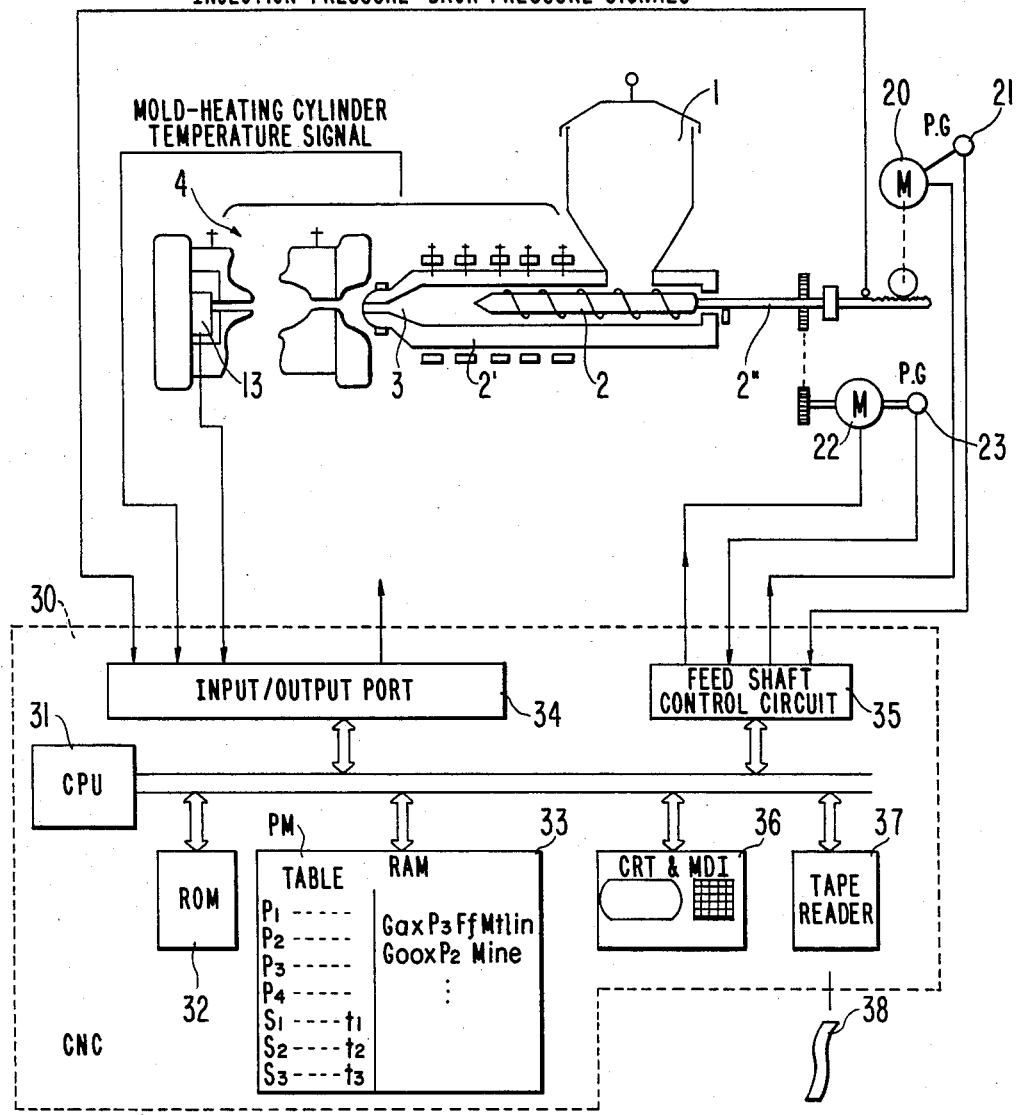
FIG. 1 is a schematic diagram of an injection molding machine control system embodying the present invention.

The present invention will be described on the basis of an embodiment illustrated in the drawings.

Figure 3:
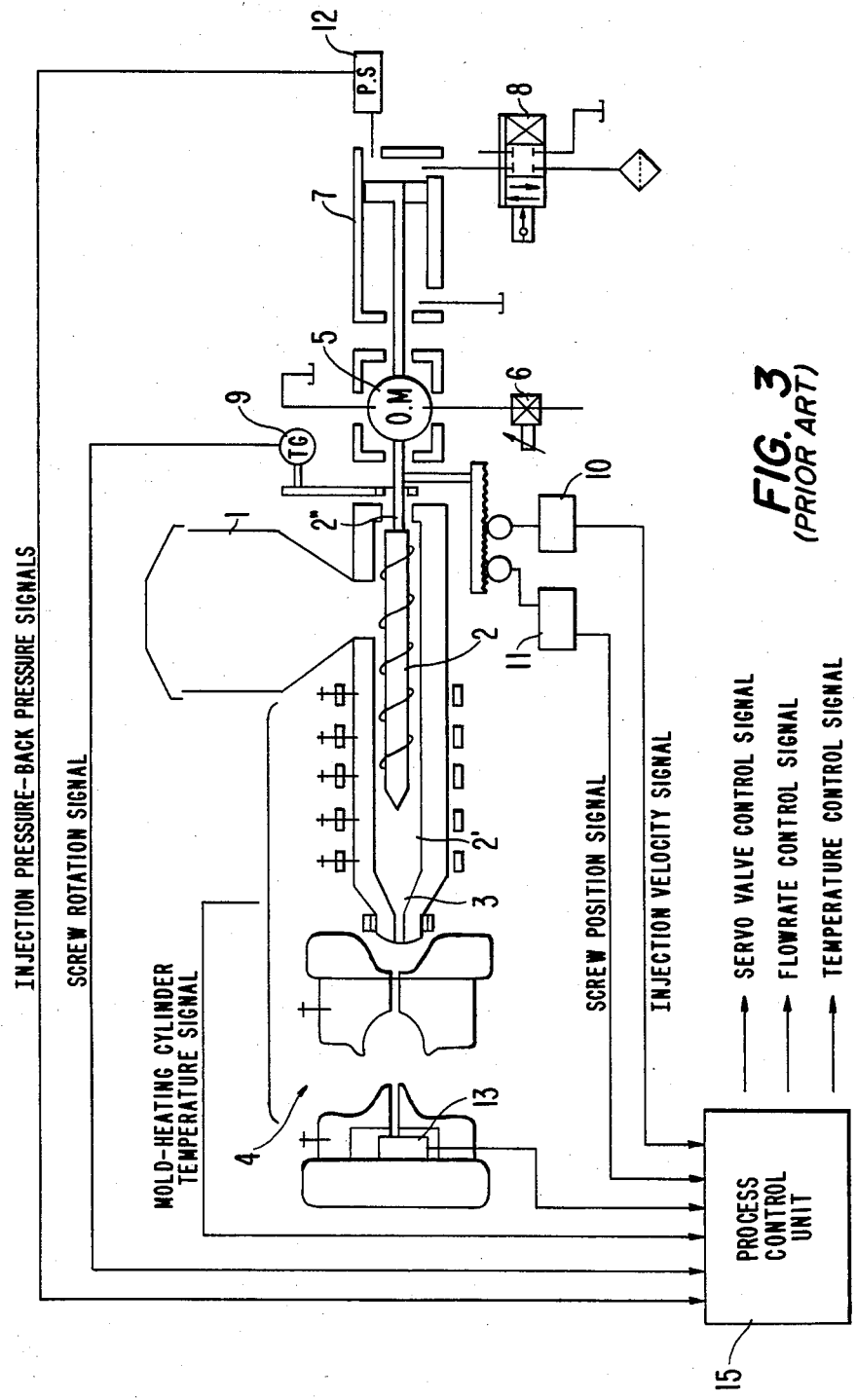
FIG. 3 is a schematic diagram of a conventional injection molding machine control system.

FIG. 1 is a schematic diagram of an injection molding machine control system embodying the present invention. Portions similar to those shown in FIG. 3 are designated by like reference characters and a detailed description thereof is deleted. In FIG. 1, numeral 20 denotes an electric motor for driving the injection shaft 2" (which is a shaft for moving the screw back and forth). Though not shown, the motor has a well-known torque limit function. Numeral 21 denotes a pulse generator for providing information indicative of rotation of the motor 20 and for producing a detection signal applied to a feed shaft control circuit 35, described below. Numeral 22 denotes an electric motor for screw rotation, and numeral 23 designates a pulse generator for providing motor rotational position and velocity signals, which are applied to the feed shaft control circuit 35. Numeral 30 represents a numerical control unit (CNC unit) having an internal computer and including a processor (CPU) 31 for executing processing based on a control program, a read-only memory (ROM) 32 storing the control program, a random-access memory (RAM) 33 for storing the results of processing performed by the CPU 31 as well as various data, an input-/output port 34, the feed shaft control circuit 35, an operator's panel 36 having a display, and a tape reader 37. Further, numeral 38 denotes an NC tape bearing machining commands in punched form. In the present invention, the control system of the electric motor 20 has a well-known torque limit function the torque limit value of which can be varied.

The operation of the injection molding machine control system of the illustrated embodiment arranged as set forth above will now be described.

The electric motor 20 for driving the injection shaft in the longitudinal direction and the electric motor 22 for rotatively driving the screw 2 are controlled by the CNC unit 30. Specifically, the CNC unit 30 receives information indicative of rotation of the electric motor 20, which is sened by the pulse generator 21, via the feed shaft control circuit 35, performs predetermined processing and subjects the electric motor 20 to feedback control. Further, the CNC unit 30 receives information indicative of rotation of the electric motor 22, which is sensed by the pulse generator 23, via the feed shaft control circuit 35, compares the rotation information with a commanded value and executes control in such a manner that the electric motor 22 will rotate in a predetermined manner. The CNC unit 30 receives a variety of control information from various portions of the injection molding machine and executes predetermined processing to control temperature as well as injection and back pressure.

A specific example of dwell control applied to the injection shaft of the injection molding machine will now be described.

In an injection step performed by the injection molding machine, a dwell operation is required for applying pressure for a prescribed period of time after the injection. In the present invention, dwell is attained by using the NC unit torque limit technique.

Figure 2:
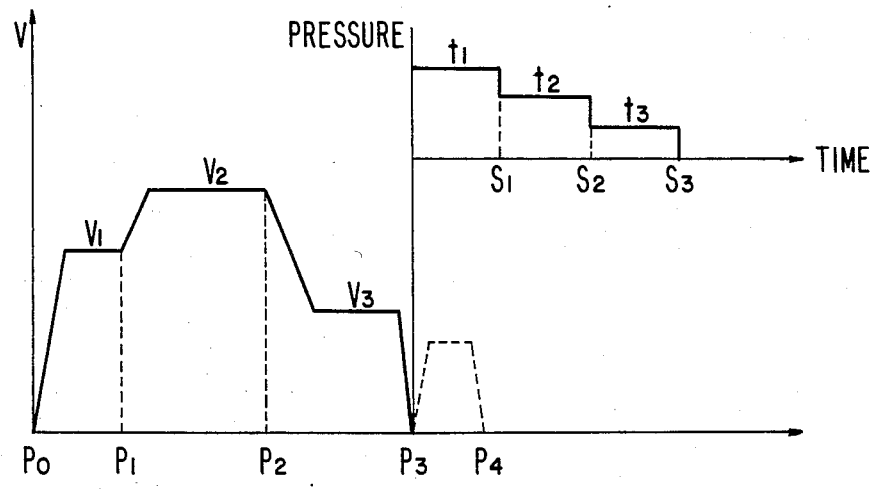
FIG. 2 is a graph for describing dwell control according to the present invention.

FIG. 2 is a view for describing this dwell operation. In the Figure, Po through P4 indicate injection shaft positions, V1 through V3 traveling velocities of the injection shaft, S1 through S3 dwell control times, and $t_1$ through $t_3$ torque limit values, namely dwell pressures.

After injection, the CNC 30 exercises velocity control in such a manner that the velocity of the injection shaft is changed at discrete positions Po through P3 of the injection shaft 2". The velocity control method is to command the position P3 and a reference velocity in the form of one block by a program, create an override table corresponding to the individual positions, store the table in a parameter area of the RAM 33, and obtain feedrate override values in accordance with the program command. Thereafter, a torque limit is applied to perform the dwell operation.

Let us describe this in detail. The commands issued are as follows, these serving as an example:

Ga×P3 F f M tlin;

G00×P4 M ine;

In the above, Ga represents a velocity control distribution command, X an address indicating position, P3 and P4 positions of the injection shaft, F an address designating the feedrate of the injection shaft, tlin a dwell indication, ine an injection completion indication, an M an M-code. In the injection operation, velocity control of the injection shaft is performed up to position P3, a conversion is made to pressure control at the position P3, and dwell is performed stepwise up to time S3. Let us describe this in further detail.

(1) The CNC unit 30 positions the injection shaft 2" at the position P3 by performing multi-stage velocity control.

(2) After confirming positioning at the point P3, the CNC unit 30 sets the torque limit value of the electric motor 20 to $t_1$.

(3) The CND unit 30 issues a position command P4 for a position beyond the final injection shaft position P3. In other words, the CNC unit 30 designates an intrusion limit by generating a velocity voltage (VCMD) and by holding pressure.

(4) When time S1 is reached, the CNC unit 30 changes over to a torque limit value $t_2$.

(5) When time S2 is reached, the CNC unit 30 changes over to a torque limit value $t_3$.

When time S3 is reached, the CNC unit 30 starts a cooling timer and completes the injection process.

The NC unit torque limit technique can thus be adapted to dwell control of an injection molding machine.

Thus, the system of the present invention has an electric motor for driving the injection shaft of an injection molding machine, and a numerical control unit for controlling the motor. After the injection shaft is positioned at a final position, the numerical control unit applies a torque limit command to the electric motor to control pressure. Accordingly, the injection molding machine control system can be simplified over that of the prior art and injection molding machine dwell control can be performed rapidly and accurately. In particular, rather than relying upon an injection molding machine dwell mechanism based on the conventional fluidic control, the present invention realizes a novel dwell system incorporating an NC unit. The present invention has outstanding effects.

Though the present invention has been described based on the illustrated embodiment, the invention is not limited to this embodiment but can be modified in various ways in accordance with the gist of the present invention, such modifications being within the scope of the invention.

Thus, the present invention is arranged to drive the injection shaft of an injection molding machine by an electric motor and to apply a torque limit command to the electric motor at the time of the dwell operation. Accordingly, the invention is particularly well-suited for application to dwell control of an injection molding machine performed by a numerical control unit.

What is claimed is:

1. A dwell control system of an injection molding machine in which raw material chips in a hopper are fed into a cylinder by a screw rotated by a first electric motor and the raw material inside the cylinder is injected into a mold by movement of the screw, comprising:
   an injection shaft having a screw;
   injection shaft moving means for moving said injection shaft longitudinally inside the cylinder, said injection shaft moving means having a torque limit function;
   means for setting a final target position for said injection shaft moving means;
   means for commanding a predetermined position beyond the target position after said injection shaft has reached the final target position; and
   means for limiting pressure received by said injection shaft when the command for moving said injection shaft to the predetermined position beyond the final target position is received, said pressure limiting means comprising means for setting the torque limit function of said injection shaft moving means.

2. A dwell control system of an injection molding machine according to claim 1, wherein said injection shaft moving means is a second electric motor.

3. A dwell control system of an injection molding machine according to claim 1, wherein at least said injection shaft moving means is controlled by a numerical control unit.

4. A dwell control system of an injection molding machine according to claim 1, wherein the pressure limit of said means for limiting pressure received by said injection shaft when the command for moving said injection shaft to the predetermined position beyond the final target position is received, is variable.

5. A dwell control system of an injection molding machine according to claim 4, wherein the pressure limit of said means for limiting pressure received by said injection shaft when the command for moving said injection shaft to the predetermined position beyond the final target position is received, is decreased with the passage of time.

6. A dwell control system for an injection molding machine having a hopper for feeding raw material chips into a cylinder by a screw extending from a rotatable injection shaft, with the raw material chips being injected into a mold by a longitudinal movement of the screw, comprising:
   an electric motor, coupled to the injection shaft, for moving the injection shaft longitudinally inside the cylinder, said electric motor having a torque limit function;
   means for setting a final target position for the injection shaft;
   means for commanding a predetermined position beyond the final target position after the injection shaft has reached the final target position; and
   means for limiting pressure received by the injection shaft when the command for moving the injection shaft to the predetermined position beyond the final target position is received, said pressure limiting means comprising means for setting the torque limit function of said electric motor.

7. A dwell control system for an injection molding machine according to claim 6, wherein said electric motor is controlled by a numerical control unit.

8. A dwell control system for an injection molding machine according to claim 7, wherein the pressure limit of said pressure limiting means is variable.

* * * * *